(12) United States Patent
Konishi et al.

(10) Patent No.: US 9,564,974 B2
(45) Date of Patent: Feb. 7, 2017

(54) OPTICAL TRANSMISSION DEVICE

(71) Applicant: MITSUBISHI ELECTRIC CORPORATION, Chiyoda-ku (JP)

(72) Inventors: Yoshiaki Konishi, Chiyoda-ku (JP); Kazuo Kubo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/766,852

(22) PCT Filed: Feb. 20, 2014

(86) PCT No.: PCT/JP2014/054019
§ 371 (c)(1),
(2) Date: Aug. 10, 2015

(87) PCT Pub. No.: WO2014/129539
PCT Pub. Date: Aug. 28, 2014

(65) Prior Publication Data
US 2016/0006512 A1    Jan. 7, 2016

(30) Foreign Application Priority Data
Feb. 21, 2013    (JP) .................................. 2013-031961

(51) Int. Cl.
*H04B 10/40*    (2013.01)
*H04B 10/516*   (2013.01)
(Continued)

(52) U.S. Cl.
CPC .............. *H04B 10/40* (2013.01); *H04B 10/25* (2013.01); *H04B 10/5161* (2013.01);
(Continued)

(58) Field of Classification Search
CPC .................................................. H04B 10/5561
See application file for complete search history.

(56) References Cited

U.S. PATENT DOCUMENTS 7,002,968 B1   2/2006   Tomizawa et al.
7,136,593 B1   11/2006  Yano
(Continued)

FOREIGN PATENT DOCUMENTS

JP    2000-151533 A    5/2000
JP    2000-358013 A    12/2000
(Continued)

OTHER PUBLICATIONS

Office Action issued Jan. 5, 2016 in Japanese Patent Application No. 2015-501495 (with English language translation).
(Continued)

*Primary Examiner* — Nathan Curs
(74) *Attorney, Agent, or Firm* — Oblon, McClelland, Maier & Neustadt, L.L.P.

(57) ABSTRACT

An optical transmission device for transmitting and receiving a multilevel-modulated optical signal includes a plurality of transmission frame processors for generating transmission frame signals accommodating a plurality of client signals that are each subjected to error correction processing and scrambling/descrambling processing, and a digital modulator/demodulator for mapping the transmission frame signals that are input to and output from the plurality of transmission frame processors to a multilevel signal. The digital modulator/demodulator performs digital modulation/demodulation, in which the plurality of transmission frame processors each have a function of shifting a phase of a pattern between a plurality of transmission frames to be mapped to a multilevel signal and to be digitally modulated/demodulated.

6 Claims, 6 Drawing Sheets

(51) Int. Cl.
*H04B 10/556* (2013.01)
*H04B 10/25* (2013.01)
*H04L 27/34* (2006.01)
*H04J 3/16* (2006.01)
*H04B 10/61* (2013.01)
*H04J 14/06* (2006.01)
*H04L 1/00* (2006.01)
*H04L 27/36* (2006.01)

(52) U.S. Cl.
CPC ....... *H04B 10/5561* (2013.01); *H04B 10/612* (2013.01); *H04J 3/1652* (2013.01); *H04J 14/06* (2013.01); *H04L 1/0042* (2013.01); *H04L 27/34* (2013.01); *H04L 27/362* (2013.01); *H04J 2203/006* (2013.01); *H04J 2203/0089* (2013.01)

(56) References Cited

U.S. PATENT DOCUMENTS

| | | |
|---|---|---|
| 2003/0179783 A1 | 9/2003 | Uekama et al. |
| 2007/0166038 A1* | 7/2007 | Yano .................. H04L 25/14 398/79 |
| 2009/0162061 A1 | 6/2009 | Kisaka et al. |
| 2010/0172651 A1* | 7/2010 | Nien .................. H04B 10/1141 398/135 |
| 2012/0002974 A1* | 1/2012 | Schenk ............. H04B 10/1149 398/130 |
| 2012/0219282 A1 | 8/2012 | Koganei et al. |

FOREIGN PATENT DOCUMENTS

| | | |
|---|---|---|
| JP | 2001-177491 A | 6/2001 |
| JP | 2003-283452 A | 10/2003 |
| JP | 3637296 B2 | 1/2005 |
| JP | 2006-222532 A | 8/2006 |
| WO | WO 2007/072921 A1 | 6/2007 |
| WO | WO 2011/030423 A1 | 3/2011 |

OTHER PUBLICATIONS

Tomoyuki Kato, et al., "Frequency Conversion, Synchronization Control, and Multiplexing Using Cross-Phase Modulation", Institute of Electronics, Information and Communication Engineers, vol. 112, No. 86, Jun. 14, 2012, pp. 23-28, with English Abstract.
"Interfaces for the Optical Transport Network (OTN)", Recommendation ITU-TG. 7091Y .1331, Dec. 2009, pp. 34-40 and 67-72.
International Search Report issued Mar. 18, 2014, in PCT/JP2014/054019, filed Feb. 20, 2014.
"Interface for the Optical Transport Network (OTN)", Recommendation ITU-TG. 709/Y .1331, Dec. 2009.
Jon Anderson, et al., "Implementation Agreement for 100G Long-Haul DWDM Transmission Module—Electromechanical (MSA-100GLH)" OIF-MSA-100GLH-EM-01.1, Optical Interface Forum, Sep. 20, 2011.
Extended European Search Report issued on Sep. 19, 2016 in European Patent Application No. 14754299.7.

\* cited by examiner

OPTICAL TRANSMISSION DEVICE

TECHNICAL FIELD

The present invention relates to an optical transmission device for transmitting and receiving a multilevel-modulated optical signal.

BACKGROUND ART

Standards for an optical signal for realizing large-capacity and long-haul communication are defined in the Optical Transport Network (OTN) as specified in ITU-T G.709. Among those, an OTN maintenance signal is formed of, for example, a repeating pattern such as ODU AIS (all "1"s), OCI (repeating "0110"), or LCK (repeating "0101"). In addition, in order to prevent signal degradation on a transmission path, such an OTN maintenance signal is specified to be subjected to scrambling operation before being output (see, for example, Non Patent Literature 1).

Further, there is disclosed an example of a 100 G long-haul transceiver for performing error correction processing for long-haul transmission and transmitting and receiving a polarization multiplexed QPSK signal (see, for example, Non Patent Literature 2).

CITATION LIST

Non Patent Literature

[NPL 1] Recommendation ITU-T G.709/Y.1331 (December 2009) "Interface for the Optical Transport Network (OTN)"
[NPL 2] OIF-MSA-100 GLH-EM-01.1, Optical Interface Forum, Sep. 20, 2011

SUMMARY OF INVENTION

Technical Problem

However, the related art has the following problem.

In a transmission system, in which independent optical channel transport unit—k (OTUk) frames of a plurality of systems are subjected to time-division multiplexing, the following problem arises when the related art is applied to perform mapping to a multilevel signal.

Every OTN maintenance signal has a fixed pattern even after scrambling. Accordingly, for example, in a case where 100 G OTU4 signals of two systems are mapped to a 200 G polarization multiplexed 16 QAM signal, when the 100 G signals are the same maintenance signals in both of the systems, a pattern having the same value for two consecutive bits is mapped to a 200 G polarization multiplexed 16 QAM pattern.

With this, even when the signal is randomized by the scrambling, the fixed pattern is output as a result, which may cause degradation of transmission characteristics.

The present invention has been made in order to solve the above-mentioned problem, and it is an object of the present invention to provide an optical transmission device capable of preventing performance degradation in an optical communication system using a multilevel (e.g., polarization multiplexed 16 QAM scheme) signal of several hundred-Gbps or, more, even at the time of transmission of data having a repeating or periodic pattern, such as an OTN maintenance signal.

Solution to Problem

According to one embodiment of the present invention, there is provided an optical transmission device for transmitting and receiving a multilevel-modulated optical signal, including: a plurality of transmission frame processors for generating transmission frame signals accommodating a plurality of client signals that are each subjected to error correction processing and scrambling/descrambling processing; and a digital modulator/demodulator for mapping the transmission frame signals that are input to and output from the plurality of transmission frame processors to a multilevel signal and performing digital modulation/demodulation, in which the plurality of transmission frame processors each have a function of shifting a phase of a pattern between a plurality of transmission frames to be mapped to a multilevel signal and be digitally modulated/demodulated.

Advantageous Effects of Invention

The optical transmission device according to the one embodiment of the present invention has the function of shifting the phase of the pattern between the plurality of transmission frames to be mapped to the multilevel signal and be digitally modulated/demodulated. Thus, it is possible to obtain the optical transmission device capable of preventing performance degradation in an optical communication system using a multilevel (e.g., polarization multiplexed 16 QAM scheme) signal of several hundred-Gbps or more, even at the time of transmission of data having a repeating or periodic pattern, such as an OTN maintenance signal.

DESCRIPTION OF EMBODIMENTS

Now, a description is given of an optical transmission device according to preferred embodiments of the present invention with reference to the drawings.

First Embodiment

Figure 1:
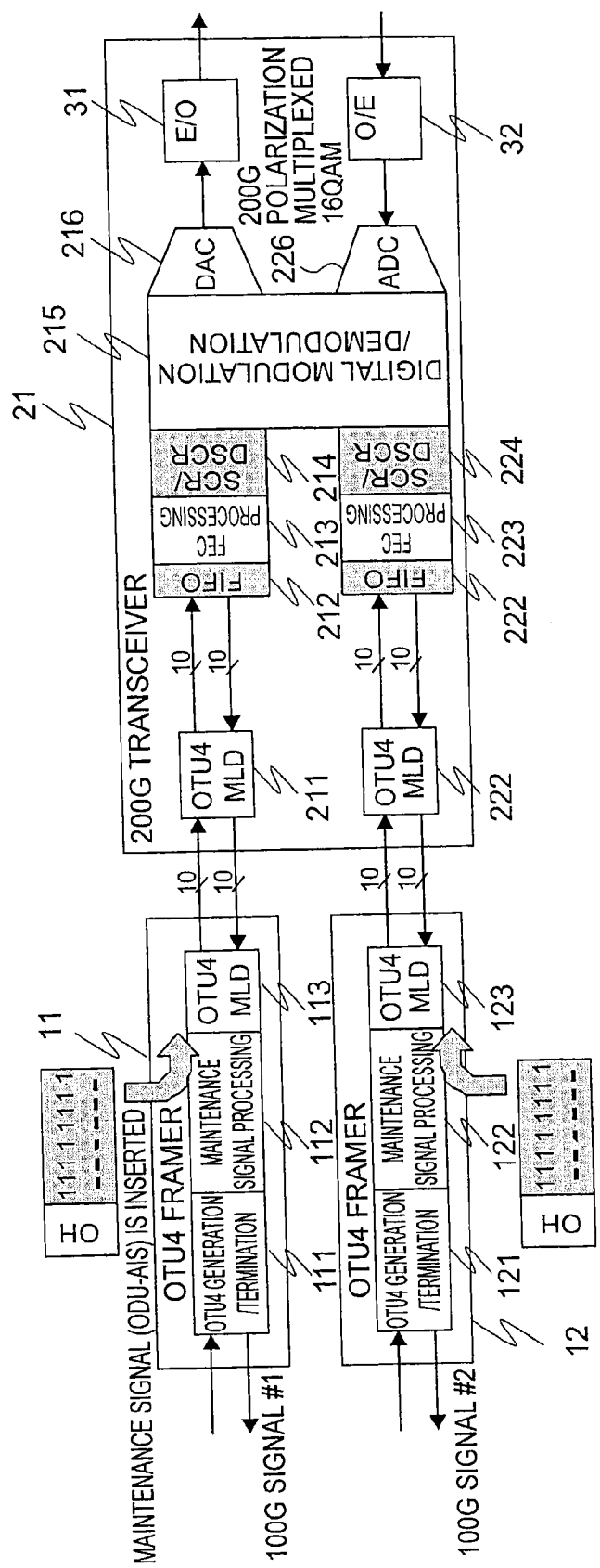
FIG. 1 is a diagram illustrating a configuration of an optical transmission device according to a first embodiment of the present invention.

FIG. 1 is a diagram illustrating a configuration of an optical transmission device according to a first embodiment of the present invention. For example, as a scheme for transmitting an optical signal, in order to realize an optical communication system realizing high-speed and long-haul transmission, such a scheme is adopted that information having a large number of bits is transmitted in a 1-symbol time period by combining quadrature amplitude modulation such as 16 quadrature amplitude modulation (16 QAM) with polarization multiplexing using polarization channels (X polarization and Y polarization). In addition, with in-phase and quadrature phase components for multilevel modulation and the X polarization and Y polarization for polarization multiplexing, eight kinds of signal components are transmitted.

FIG. 1 illustrates an exemplary case where 100 G signals of two systems are transmitted and received by 200 G polarization multiplexed 16 QAM. The optical transmission device illustrated in FIG. 1 includes OTU4 framers 11 and 12 for processing a 100 G OTU signal, a 200 G transceiver 21 for processing a 200 G signal, an E/O 31 for converting an electrical signal into an optical signal, and an O/E 32 for converting an optical signal into an electrical signal.

The OTU4 framers 11 and 12 respectively include the following components.

OTU4 frame generation/termination units 111 and 121 for 100 G signals #1 and #2

Maintenance generation signal processors 112 and 122 for the 100 G signals #1 and #2

OTU4 MLD units 113 and 123 for interfacing with the 200 G transceiver 21 by multiple lane distribution (MLD)

Further, the 200 G transceiver 21 includes the following components.

OTU4 MLD units 211 and 221 for 100 G systems #1 and #2 for interfacing with the OTU4 framers 11 and 12 by the MLD Memories (FIFOs) 212 and 222 capable of temporarily storing an OTU4 frame to shift a frame phase TEC processing circuits 213 and 223 for the 100 G systems #1 and #2

Scramblers/descramblers 214 and 224 for the 100 G systems #1 and #2

A digital modulator/demodulator 215 for mapping a signal output from the scramblers 214 and 224 to symbols of an optical signal and performing digital modulation/demodulation processing A DA converter (DAC) 216 for generating a modulated optical signal (analog)

An AD converter (ADC) 226 for converting a modulated optical signal (analog) into a digital signal Herein, the memory (FIFO) 212, the FEC processing circuit 213, and the scrambler/descrambler 214, and the memory (FIFO) 222, the FEC processing circuit 223, and the scrambler/descrambler 224 correspond to a plurality of transmission frame processors arranged respectively to a plurality of client signals.

Figure 2:
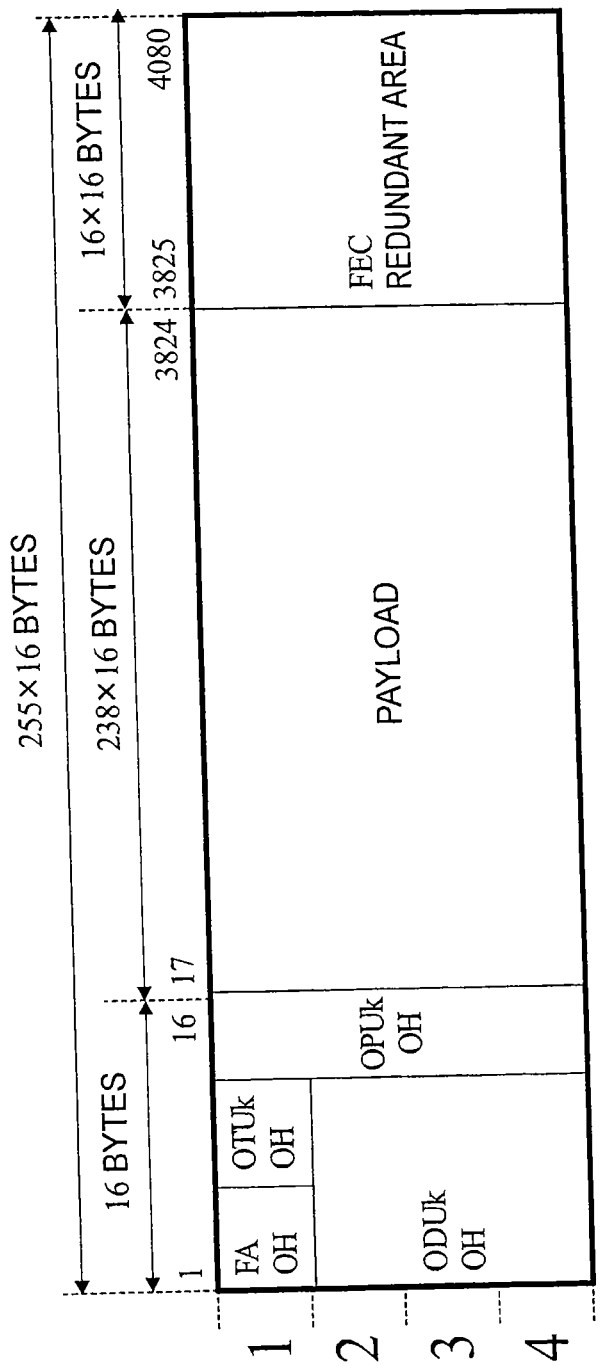
FIG. 2 is a diagram illustrating a format of an OTUk frame to be processed by OTU4 framers of the optical transmission device according to the first embodiment of the present invention.

FIG. 2 is a diagram illustrating a format of an OTUk frame to be processed by the OTU4 framers 11 and 12 of the optical transmission device according to the first embodiment of the present invention. More specifically, the OTUk frame illustrated in FIG. 2 is formed of the following components.

A payload for storing actual information data such as a client signal

A frame alignment overhead (FA OH) for frame synchronization

An OTUk OH and optical channel data unit-k overhead (ODUk OH) for maintenance and monitoring information An optical channel payload unit-k overhead (OPUk OH) for payload mapping An FEC redundant area for storing information of an error correction code for correcting bit errors caused due to deterioration in an optical quality after transmission A Reed-Solomon code (hereinafter referred to as "RS code") is usually used as an error correction code. Note that, in general, a part formed of FA OH, OTUk OH, ODUk OH, and OPUk OH is called "overhead".

Figure 3:
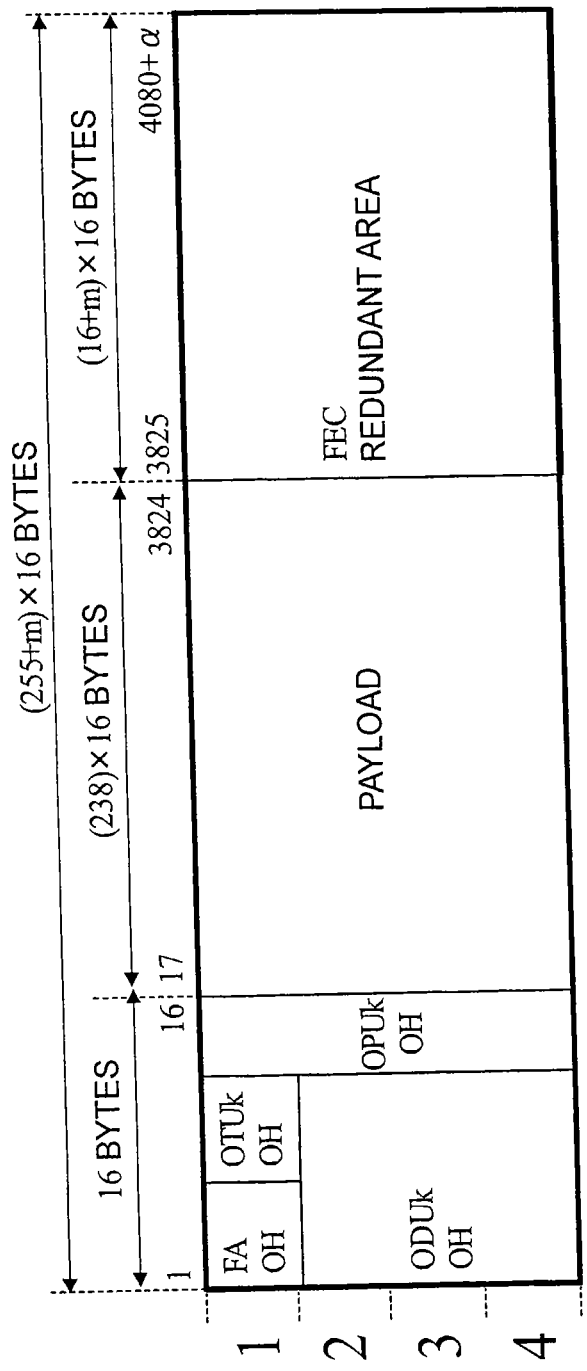
FIG. 3 is a diagram illustrating a format of an OTUkV frame to be processed by FEC processing circuits of the optical transmission device according to the first embodiment of the present invention.

On the other hand, FIG. 3 is a diagram illustrating a format of an OTUkV frame to be processed by the FEC processing circuits 213 and 223 of the optical transmission device according to the first embodiment of the present invention. As illustrated in FIG. 3, for example, an FEC redundant area is extended as compared with the FEC redundant area of FIG. 2 to enhance error correction performance, to thereby realize long-haul transmission.

Figure 4:
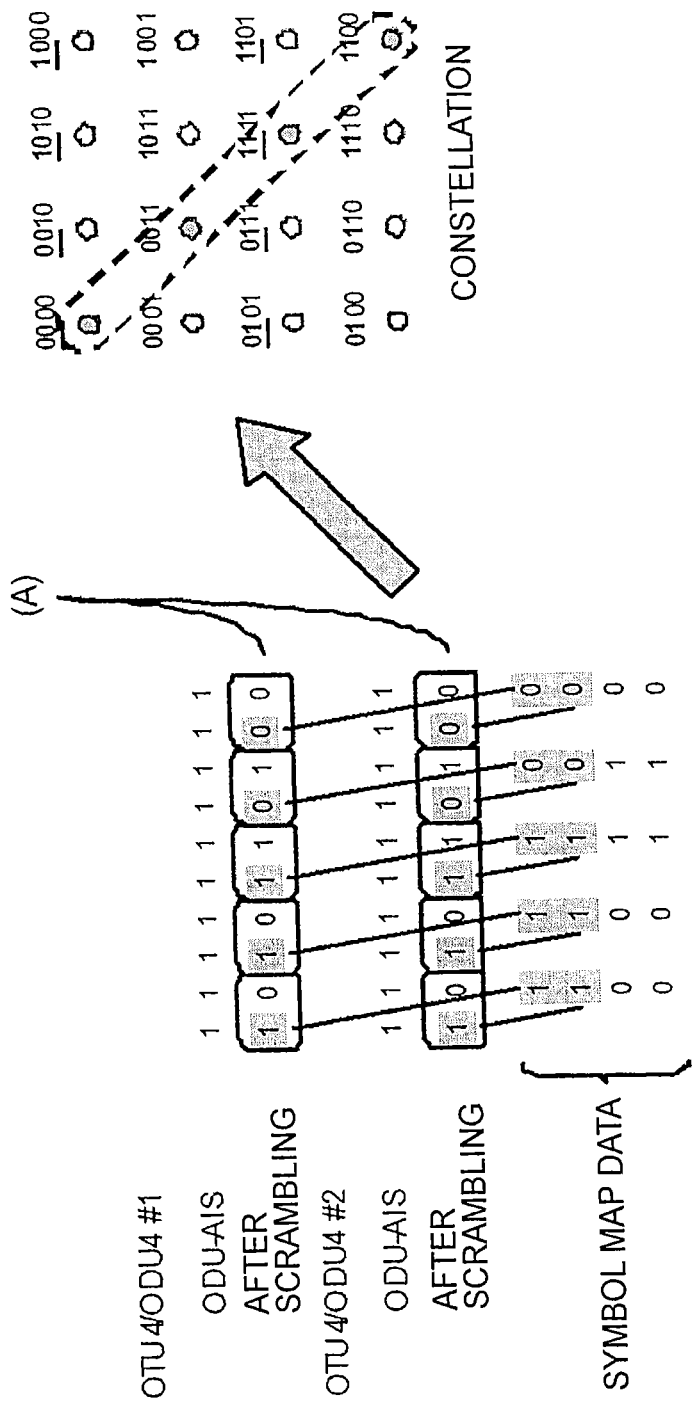
FIG. 4 is a diagram illustrating a symbol transition in polarization multiplexed 16 QAM at the time of transmission of an OTN maintenance signal (ODU-AIS) in the optical transmission device according to the first embodiment of the present invention.

FIG. 4 is a diagram illustrating a symbol transition in polarization multiplexed 16 QAM at the time of transmission of an OTN maintenance signal (ODU-AIS) in the optical transmission device according to the first embodiment of the present invention. Only symbols having pairs of two consecutive bits having the same value make transitions. It is assumed that as illustrated in the left part of FIG. 4, after the ODU-AIS signal (all "1"s) is subjected to scrambling, a fixed pattern of "10 10 11 01 00" is obtained. In other words, as a result of calculating "EXOR" of "ODU-AIS signal (fixed value)×PRBS (fixed value)", as indicated by "(A)" of FIG. 4, the same patterns are obtained in both of the two systems.

When the 100 G signals of the two systems (200 G) having a uniform frame phase are transmitted by the polarization multiplexed 16 QAM, symbol map data is as illustrated in the lower left part of FIG. 4. When this data is represented on a constellation map, symbols are mapped at positions surrounded by the broken line in the diagram of the right part of FIG. 4. In other words, only four symbol points from a top-left symbol point to a right-bottom symbol point make transitions.

Figure 5:
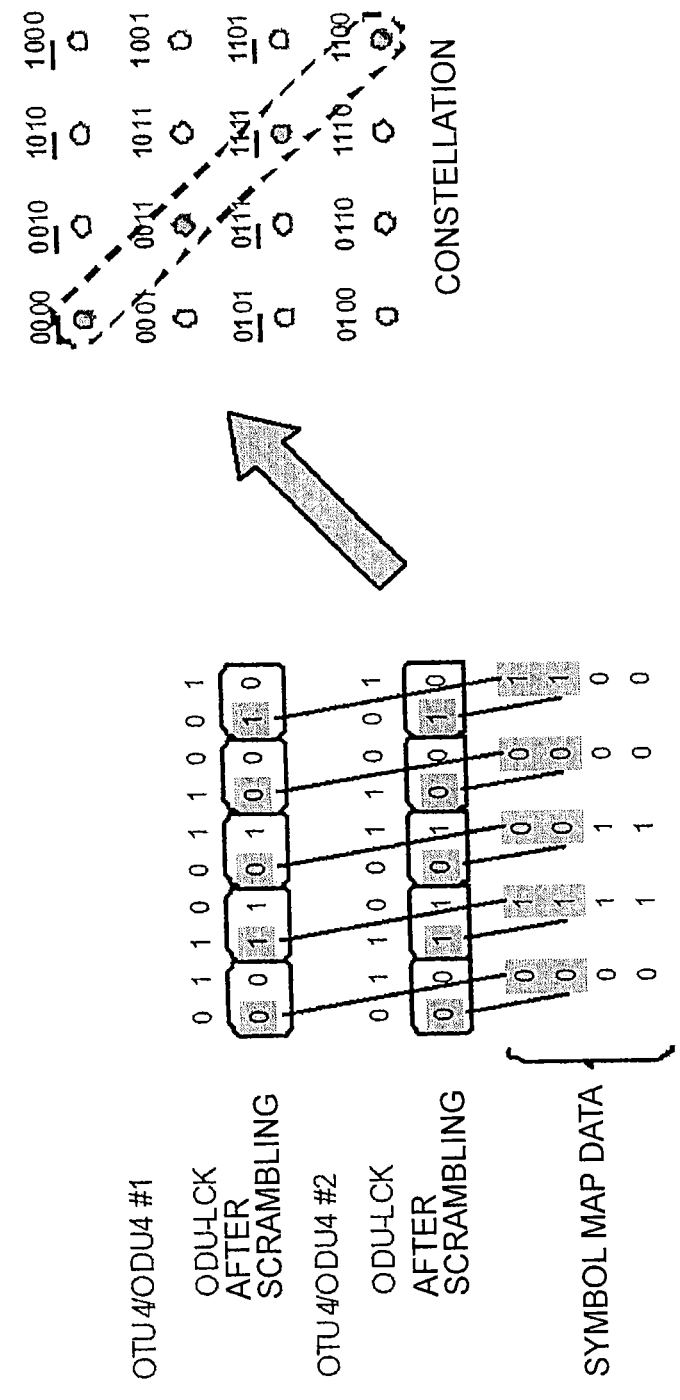
FIG. 5 is a diagram illustrating a symbol transition in polarization multiplexed 16 QAM at the time of transmission of an OTN maintenance signal (ODU-LCK) in the optical transmission device according to the first embodiment of the present invention.

Similarly, FIG. 5 is a diagram illustrating a symbol transition in polarization multiplexed 16 QAM at the time of transmission of an OTN maintenance signal (ODU-LCK) in the optical transmission device according to the first embodiment of the present invention. Only symbols having pairs of two consecutive bits having the same value make transitions. It is assumed that as illustrated in the left part of FIG. 5, after the ODU-LCK signal (repeating "0101") is subjected to scrambling, a fixed pattern of "00 11 01 00 10" is obtained.

When the 100 G signals of the two systems (200 G) having a uniform frame phase are transmitted by the polarization multiplexed 16 QAM, symbol map data is as illustrated in the lower left part of FIG. 5. When this data is represented on a constellation map, symbols are mapped at positions surrounded by the broken line in the diagram of the right part of FIG. 5. In other words, only four symbol points from a top-left symbol point to a right-bottom symbol point make transitions.

Accordingly, in the first embodiment, the FIFOs 212 and 222 are arranged individually for the respective 100 G systems so that the phase of the OTU4V frame to be output in the form of the optical signal is shifted for each 100 G system. With this configuration, the pattern at the time of transmission of the OTN maintenance signal is shifted for each 100 G system, and hence it is possible to prevent the occurrence of the fixed patterns at the optical-symbol level, which occur in FIG. 4 and FIG. 5. In other words, it is possible to provide the optical transmission device capable of preventing the performance degradation even at the time of transmission of data having a repeating or periodic pattern, such as an OTN maintenance signal.

As described above, according to the first embodiment, the memory (FIFO) capable of temporarily storing the OTU4 frame to shift the phase of the frame is arranged in the 200 G transceiver for each 100 G system. As a result, the pattern at the time of transmission of the OTN maintenance signal can be shifted for each 100 G system, and hence it is possible to provide the optical transmission device capable of preventing the performance degradation.

Second Embodiment

Figure 6:
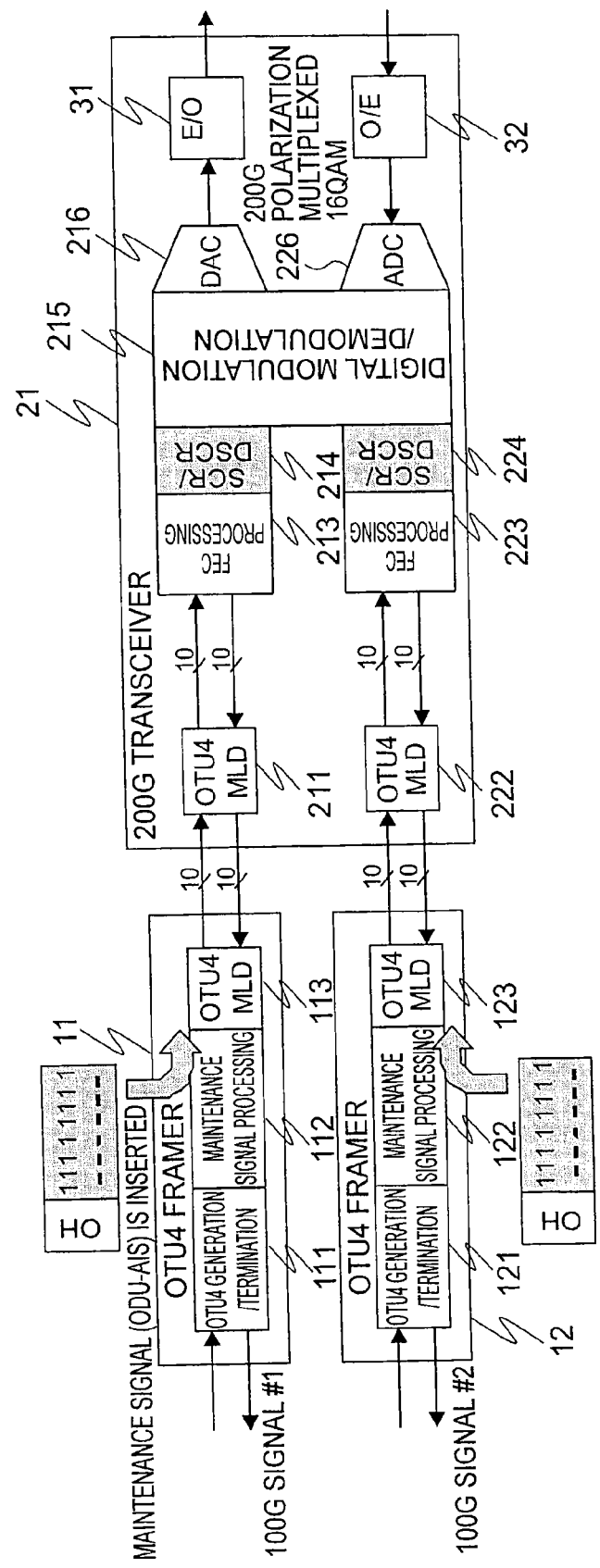
FIG. 6 is a diagram illustrating a configuration of an optical transmission device according to a second embodiment of the present invention.

FIG. 6 is a diagram illustrating a configuration of an optical transmission device according to a second embodiment of the present invention. As compared with the configuration of FIG. 1 according to the first embodiment, the configuration of FIG. 6 according to the second embodiment differs in that the FIFOs 212 and 222 are removed, and that a mechanism for changing a seed value for generating a pseudo-random pattern is added into each of the scramblers/descramblers 214 and 224. Other components and functions are the same as those of the first embodiment described above.

For example, in ITU-T G.709, at the end of the FA OH of the OTUkV frame illustrated in FIG. 3, each frame is initialized with an all-"1"s seed value. Thus, when the seed value for initialization is changed for each 100 G system, the value of the pseudo-random pattern is shifted as a result.

In this manner, in the second embodiment, the mechanism for changing the seed value for generating the pseudo-random pattern for each 100 G system is arranged in each of the scramblers/descramblers 214 and 224. Accordingly, the value of a random signal can be varied for each 100 G system, and hence it is possible to prevent the occurrence of the fixed patterns at the optical-symbol level, which occur in FIG. 4 and FIG. 5. In other words, it is possible to provide the optical transmission device capable of preventing the performance degradation even at the time of transmission of data having a repeating or periodic pattern, such as an OTN maintenance signal.

As described above, according to the second embodiment, the mechanism for changing the seed value for generating the pseudo-random pattern for each 100 G system is arranged in each of the scramblers/descramblers of the 200 G transceiver for each 100 G system. As a result, the pattern at the time of transmission of the OTN maintenance signal can be shifted for each 100 G system, and hence it is possible to provide the optical transmission device capable of preventing the performance degradation.

Note that, the configuration having the two systems is described in the first and second embodiments described above, but it is apparent that similar effects can be acquired even in a configuration having three or more systems by configuring the optical transmission device in a similar manner. Further, the example of the mapping to the polarization multiplexed 16 QAM signal is described in the first and second embodiments described above, but it is apparent that similar effects can be acquired even when the optical transmission device is configured to perform mapping to another type of multilevel signal such as a 64 QAM signal.

The invention claimed is:

1. An optical transmission device for transmitting a multilevel-modulated optical signal, the device comprising:
   a plurality of phase shifting devices that each shifts a phase of a pattern of a received client signal to produce a shifted pattern;
   a plurality of error correction processing devices that each performs an error correction process on the shifted pattern produced by a corresponding one of the phase shifting devices to produce an error correction processed shifted pattern;
   a plurality of scrambling devices that each scramble a corresponding one of the error correction processed shifted patterns to produce a scrambled pattern;
   a digital modulator that maps the scrambled patterns produced by the scrambling devices to multilevel signals, and digitally modulates the mapped multilevel signals to produce a multilevel-modulated electrical signal; and
   an electrical to optical converter that converts the multilevel-modulated electrical signal into the multilevel-modulated optical signal for optical transmission.

2. The optical transmission device according to claim 1, wherein the plurality of phase shifting devices each include a memory for shifting the phase of each of the plurality of client signals.

3. The optical transmission device according to claim 1, wherein the plurality of phase shifting devices each change a seed value for generating a pseudo-random pattern used by the scrambling devices when performing the scrambling.

4. An optical transmission device for receiving a multilevel-modulated optical signal transmitted by the optical transmission device for transmitting described in claim 1, the optical transmission device for receiving comprising:
   an optical to electrical converter that converts a received multilevel-modulated optical signal into an multilevel-modulated electrical signal;
   a digital demodulator that digitally demodulates the multilevel-modulated electrical signal, and maps the demodulated signal to a binary digital signal for each client;
   a plurality of descrambling devices that each descramble a corresponding binary digital signal for each client to produce a descrambled client signal;
   a plurality of error correction processing devices that each performs an error correction process on a corresponding one of the descrambled client signals to produce a shifted pattern; and
   a plurality of phase shifting devices that each shifts a phase of a corresponding one of the shifted patterns to produce a client signal.

5. The optical transmission device according to claim 4, wherein the plurality of phase shifting devices each includes a memory for shifting the phase of the corresponding shifted pattern.

6. The optical transmission device according to claim 4, wherein the plurality of phase shifting devices is each configured to change a seed value for generating a pseudo-random pattern used by the descrambling devices.

* * * * *